2 Sheets--Sheet 1.

C. MOORE.
Hydraulic Air Compressing Apparatus.

No. 140,524. Patented July 1, 1873.

Witnesses
John Becker.
Fred: Haynes

Charles Moore
by his Attorneys
Brown & Allen

AM. PHOTO-LITHOGRAPHIC CO. N.Y. (OSBORNE'S PROCESS.)

2 Sheets--Sheet 2.

C. MOORE.
Hydraulic Air Compressing Apparatus.

No. 140,524. Patented July 1, 1873.

Witnesses
John Becker
Fred Hayne

Charles Moore
by his Attorney
Brown & Allen

UNITED STATES PATENT OFFICE.

CHARLES MOORE, OF JERSEY CITY, N. J., ASSIGNOR OF PART INTEREST TO CHARLES BAECHLER AND GEORGE SOMMER, OF SAME PLACE.

IMPROVEMENT IN HYDRAULIC AIR-COMPRESSING APPARATUS.

Specification forming part of Letters Patent No. 140,524, dated July 1, 1873; application filed May 15, 1873.

*To all whom it may concern:*

Be it known that I, CHARLES MOORE, of Jersey City, in the county of Hudson and State of New Jersey, have invented an Improvement in Hydraulic Air-Compressing Apparatus, of which the following is a specification:

This invention generally consists in a novel combination of devices for automatically compressing air by the direct agency of water, the same including a close vessel or tank into and from which the water under a head or pressure is alternately introduced and discharged by means of a main valve and auxiliary valve, the latter of which is controlled by a float that rises and falls with the water in the tank, causing the air to be alternately admitted to and discharged under pressure from the tank, by or through valves arranged to open and close communication with the upper portion thereof, the compressed air discharge-valve in such arrangement preferably being made double and buoyant, or with an attached float, so that in case of any derangement of the water valves or apparatus the water rushing into the tank, and unduly rising therein, will close said valve against egress of water into the receiver of the compressed air.

Figure 1:
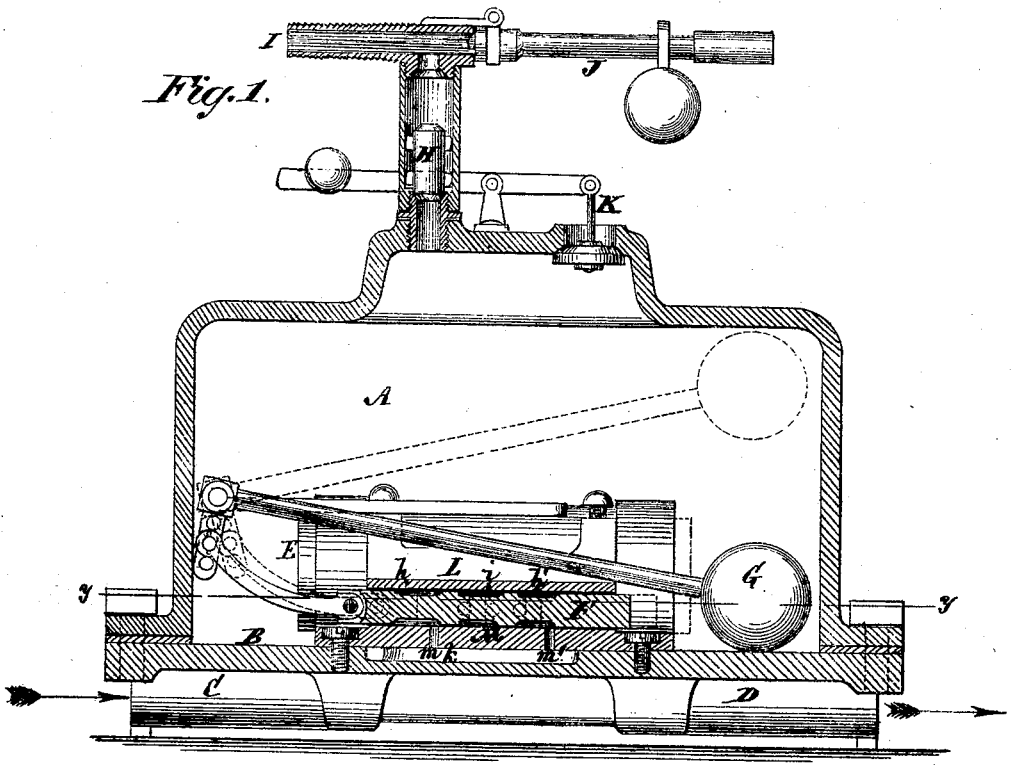
Figure 2:
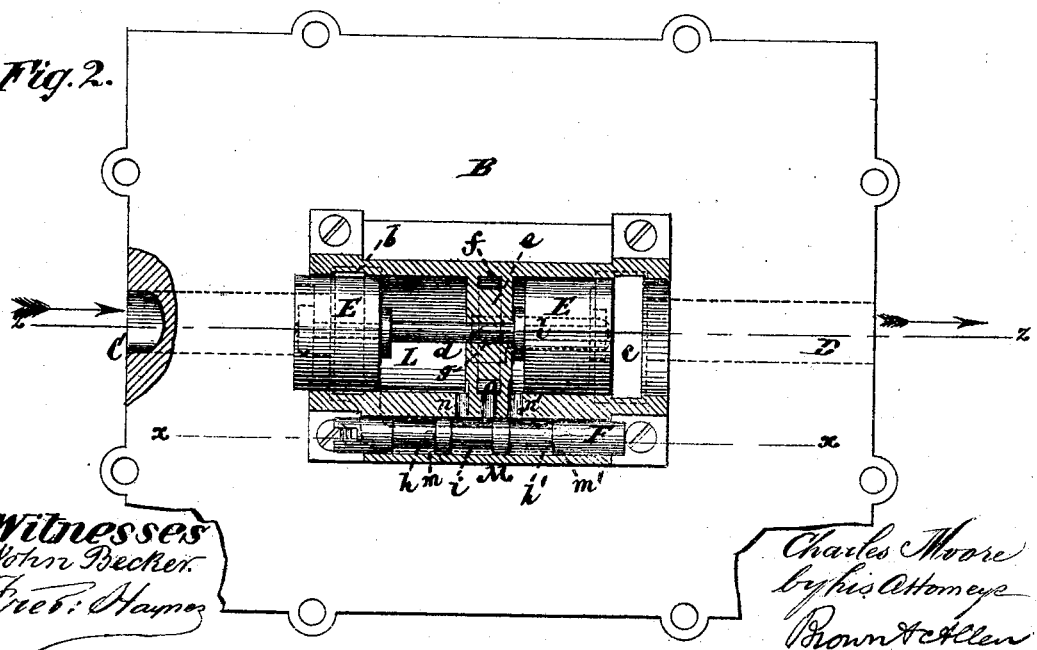
Figure 3:
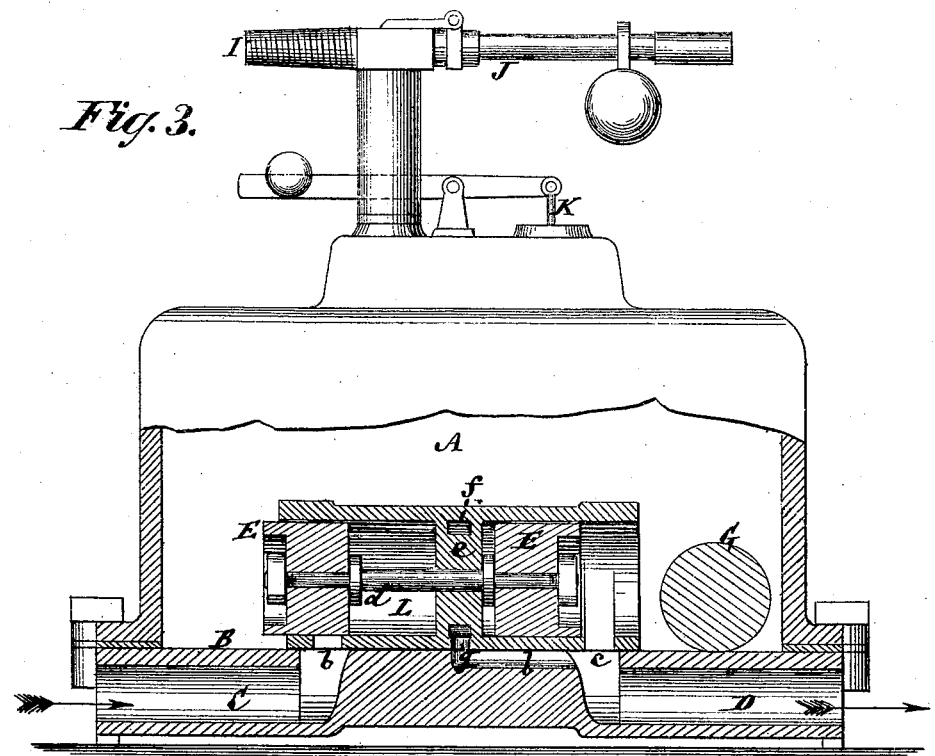
Figure 4:
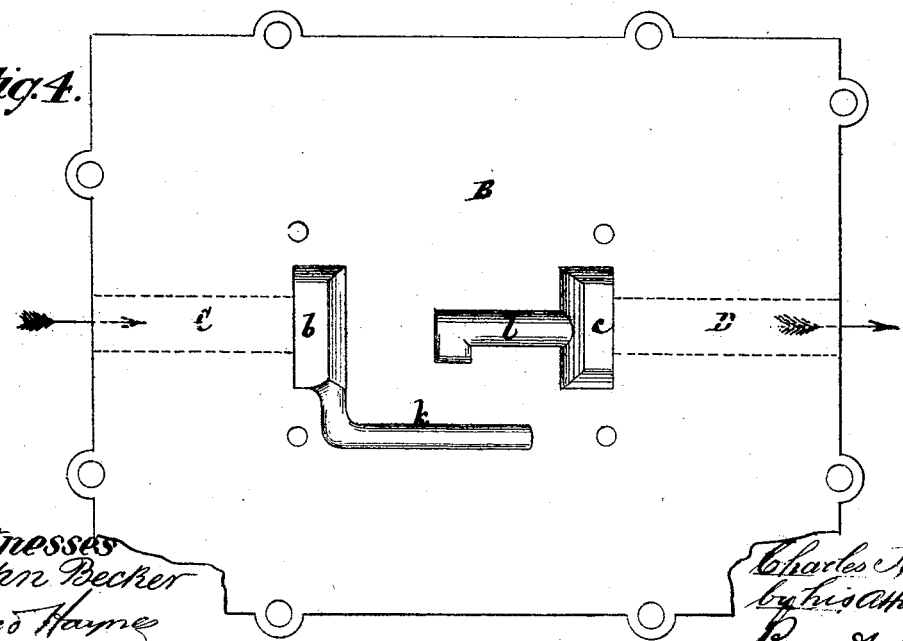

In the accompanying drawing, which forms part of this specification, Figure 1 represents an irregular vertical section of the apparatus taken partly as indicated by the line *x x*; Fig. 2, an irregular horizontal section partly on the line *y y*; Fig. 3, a partially sectional side elevation of the apparatus, the section being on the line *z z*; and Fig. 4, a plan of the bed-plate in illustration of certain passages.

Similar letters of reference indicate corresponding parts.

A is a close tank or chamber, mounted on a bed-plate, B, which latter is provided with a water-inlet, C, and water-outlet, D. The water is admitted, under any suitable head or pressure, by the inlet C to the tank A, and discharged from the latter through the outlet D by the automatic action of valves E F, the one, F, of which is controlled by a float, G, with which it is connected by rod and levers, or otherwise, said water as it rises in the tank forcing the air from the upper portion thereof through a valve, H, into a pipe, I, which connects with any suitable compressed-air receiver, and which is fitted with a safety-valve, J, to regulate the pressure; and the water as it falls in the tank, when being discharged therefrom, allowing a fresh charge of air to enter the tank by a weighted inlet-valve, K, for subsequent compression or delivery by the succeeding ascent of water under pressure in the tank. This produces an intermittent compressing action, but by a suitable duplication of parts and disposition of the water-valves a continuous delivery of compressed air into the receiver may be obtained. The valve E is what I term the main valve, inasmuch as it directly controls the ingress and egress of water to and from the tank A by ports *b c* in communication with the inlet C and outlet D. This valve is a free and independent slide, composed of piston-heads at the opposite ends of one and the same rod *d*, and working within a cylinder, L, provided with an intermediate transverse partition, *e*, on the reverse sides of which the piston-heads of the valve E work, and which has an exhaust-cavity, *f*, around it in communication by a port, *g*, with the outlet D. The cylinder L is open at its opposite ends to the tank A, and accordingly as the piston-heads of the valve E are made to cover or uncover the the ports *b c* the water is alternately admitted to or discharged from the tank A. Said valve E is thrown to the right or to the left to produce such action by the pressure of the water accordingly as it is admitted to or exhausted from opposite sides alternately of the partition *e*, to produce an active force or pressure on either piston-head of the valve E alternately. The auxiliary or supplemental valve F, by which the water is admitted to and discharged from opposite sides of the partition *e*, alternately, to give a reverse intermittent movement to the valve E, as and for the purposes hereinbefore set forth, is also a piston slide-valve arranged to work within a cylinder, M, open at its ends to the interior of the tank A; and said valve being constructed of a series of heads or swells, with spaces *h, h'*, and *i* between them, arranged in such relation with the passages controlled by said valve that the latter is balanced in its action, as in the case of other auxiliary valves controlling main valves for working steam-pumps and other purposes. Thus, the bed-plate B has passages $k$ $l$ in its its upper surface, the one $k$ of which connects with the inlet-port $b$, and the other $l$ of which connects with the outlet-port $c$. The passage $k$ also connects by ports $m$ $m'$ with the cylinder M of the valve F within the spaces $h$ $h'$ of said valve, and the space $i$ by a port, $o$, with the exhaust-cavity $f$ of the valve-cylinder L; and on the opposite sides of the partition $e$ of said cylinder are ports $n$ $n'$ in communication with the valve-cylinder M, and arranged so that as the valve F is moved first in the one direction and then in the other the ports $n$ $n'$ are alternately brought into communication with the exhaust-cavity $f$ and with the inlet-passage $k$. Supposing the valve E to have been moved to the right, and the port $b$ to be uncovered, and the port $c$ closed by said valve, then water will freely enter into the tank A by the port $b$, and continue to rise therein, forcing out the air through the valve till the float G in rising reaches a certain elevation, and by its connection with the valve F moves the latter to the right and causes water to enter by the port $n$ to throw the valve E to the left, and at the same time opening the port $n'$ to the exhaust-cavity $f$, the valve E in such movement closing the port $b$ and opening the port $c$, which allows the water to run off from the tank till the float G in its descent moves the valve F in a reverse direction, when water will be admitted by the port $n'$ and exhausted by the port $n$ to throw the valve E to the right again, thus keeping up a continuous automatic action. The valve H, round which air is delivered from the tank, is made double faced or ended for operation against an upper or discharging as well as a lower or receiving seat in case of any interference with the proper working of the apparatus, and so that water filling the tank will be prevented from passing off by the pipe I to the compressed-air receiver. To this end said valve H is made buoyant in water, either by constructing it sufficiently light or attaching to it a float, thereby causing it to be lifted by water entering through its lower seat, and in due course to close against the upper seat.

What is here claimed, and desired to be secured by Letters Patent, is—

The combination, with the air-compressing water chamber or tank A, provided with upper air inlet and outlet valves, of the free or independent main water-valve E and supplementary water-valve F, controlled by a float within the tank, and arranged for operation in relation with passages to keep up an automatic action of the apparatus, substantially as specified.

CHARLES MOORE.

Witnesses:
FRED. HAYNES,
MICHAEL RYAN.